Feb. 22, 1927.

C. MACMILLAN 1,618,766

CENTRIFUGALLY OPERATED CONTACT MAKING DEVICE

Filed May 17, 1924

Inventor
Campbell Macmillan
by
His Attorney

Patented Feb. 22, 1927.

1,618,766

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

CENTRIFUGALLY-OPERATED CONTACT-MAKING DEVICE.

Application filed May 17, 1924. Serial No. 714,181.

My invention relates to centrifugally operated contact making devices, and while applicable to such devices generally, it is particularly adapted to contact making devices such as are used in starting alternating current electric motors in which the secondary member is provided with a closed circuited winding having a resistance in circuit with said winding for the purpose of producing a good starting torque, the said resistance being gradually cut out of circuit step by step as the speed of the motor increases.

Centrifugally operated starting devices have long been used in starting alternating current motors of the wound rotor type. These starting devices are connected in the secondary circuit of the motor and operate to short-circuit the different units of resistance as the speed of the motor increases. In order to control such a motor in the above manner, it is desirable to provide more than one step of resistance together with the necessary switches so that the variations of current and torque of the secondary circuit can be varied gradually. These devices as heretofore constructed require considerable space and are expensive to build.

My invention consists in a novel construction of a centrifugally operated device which requires but a single resilient means for biasing a plurality of switches against centrifugal force, and which secures a marked economy of space and cost as compared with such devices as heretofore constructed.

Figure 1:
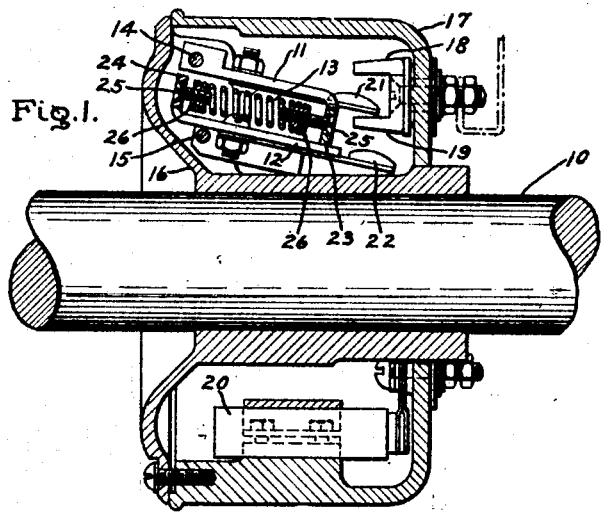
Figure 2:
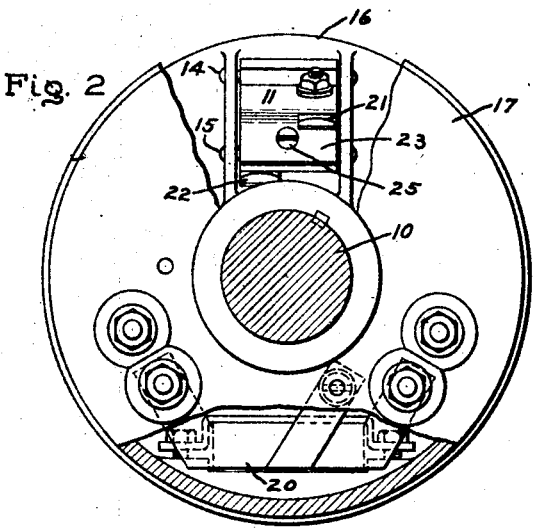
Figure 3:
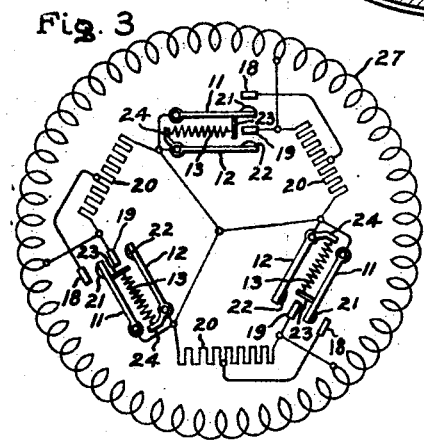

The various features of novelty which characterize my invention are pointed out with particularity in the claims annexed to and forming a part of this specification. For a better understanding of my invention and the advantages thereof, reference may be had to the following description taken in connection with the accompanying drawing, in which Fig. 1 is a side elevation showing a centrifugally operated contact making device embodying my invention; Fig. 2 is a fragmentary end elevation of the embodiment shown in Fig. 1, and Fig. 3 is a diagrammatic view showing the manner of connecting a switch embodying my invention to a three phase rotor winding of an induction motor.

In Figs. 1 and 2 of the drawing, a contact making device embodying my invention is shown mounted upon a rotatable shaft 10 and is provided with two contact carrying arms 11 and 12 which are adapted to move outwardly in response to different speeds of rotation and establish different electrical connections as the speed of the shaft 10 increases. These arms 11 and 12 are biased against movement due to centrifugal force by a single resilient means 13 which by reason of its location exerts a different biasing effect upon the arms 11 and 12 and thus permits them to respond to centrifugal force at different speeds of rotation, and in the present embodiment they short-circuit different sections of resistance to thereby vary the resistance of the secondary circuit of the motor and thus produce the desired characteristics for the successful starting of the motor.

The arms 11 and 12 are mounted upon pivots 14 and 15 respectively, which are carried by a member 16 mounted upon the shaft 10. These arms extend in the same direction from their pivots. The member 16 is provided with a cover or enclosing member 17. This cover 17 supports contacts 18 and 19 which are arranged adjacent one another and are connected to a resistance unit 20, also carried by the cover 17. The arms 11 and 12 carry contacts 21 and 22 which cooperate respectively with the contacts 18 and 19 to successively short-circuit different sections of the resistance unit 20 as the speed of the motor increases. The pivots 14 and 15 of arms 11 and 12 are located at different distances from the center of rotation on the shaft 10 and the resilient means 13 is located between these pivots, and is secured at one end to one of said arms and at its other end to the other of said arms in such a manner that it lies between the arms and extends substantially parallel thereto. In the drawing, the outer arm 11 is shown having a projection 23 at its free or contact end which extends toward the inner arm 12 and engages the latter when the device is at rest, whereby said inner arm acts as a stop for said outer arm. The arm 12 is shown as having a projection 24 located on the opposite side or back of the pivots 14 and 15, somewhat removed from the pivot 15, and extending toward the arm 11. The projections 23 and 24 are provided with counter sunk holes through which screws 25 extend. These screws engage threaded plugs 26 which are inserted in the ends of the resilient means 13, which in the present embodiment is shown as a helical tension spring. By turning either of the screws 25, the tension of the spring 13 can be varied as desired. These screws 25 are provided with conical heads which rest in the counter sunk holes of the projections 23 and 24 and permit the spring 13 to maintain a line of force with respect to the arms 11 and 12 approximating that which would be secured by a true ball and socket support.

In the above described arrangement, the contact carrying arms 11 and 12 together with the spring 13 occupy a minimum of space, require no additional space for relative movement of the spring 13, and the combined space occupied by the movable parts scarcely differs from that occupied by them in their initial position. The primary object of this form of construction is to secure economy of space by disposing the springs and levers as shown, whereby two complete movements are effected by parts taking little more space than that required for a single device. If it is desired to change the ratios of the speeds of the two levers 11 and 12 it is possible to do so without destroying the symmetry of position and dynamic balance of the unit as a whole. This arrangement also permits the spring 13 to adjust itself so as to apply force in a straight line between the arms 11 and 12, so that the moment arm of resisting force exerted by the spring 13 on each of the arms 11 and 12 is reduced as the arms move outwardly. This reduction of the resisting moment operates to reduce the stability of the arms 11 and 12 and produces a relatively quick or snap movement of the arms 11 and 12 as they are about to engage the stationary contacts 18 and 19 and thus provides a quick make and break in the circuits controlled thereby. The instability or snap action thus imparted to the arms 11 and 12 by the spring 13 is determined by the location of the projection 24 with respect to the pivots 14 and 15. For instance, if the distance between the projection 24 and pivot 15 is increased, the instability of the arms will also be increased and vice versa. Another feature incident to the location of the projection 24 back of the pivots 14 and 15 is that the moment arm of resisting force exerted by the spring 13 upon arm 12 is first increased as the arm 11 moves outwardly, thus insuring that the arm 12 will not start to move outwardly until after arm 11 has reached its extreme outer or contact making position and that when the arm 12 begins to move outwardly due to increased centrifugal force the moment arm of opposing force exerted by spring 13 will decrease and eventually permit this snap action to occur in arm 12.

With the spring 13 supported and biasing the arms 11 and 12 against movement, as shown, forces appropriate to those required at two speeds in the approximate ratio of two to one are obtained. This result depends upon the proper selection of three factors which are, (1) the effective weights of the lever arms which give a measure of the masses acted on by centrifugal force, (2) the relative distances of these masses from the axis of the main shaft, which determine the arms effective for centrifugal force, and, (3) the arms of the moments given by the spring 13 about pivots 14 and 15 to the levers 11 and 12 as hereinbefore described. After the relative speeds at which these two levers operate have been determined by suitable values of the three factors mentioned appropriate absolute values may be given to these speeds by varying the tension of the spring 13 by means of screws 25.

While I have so far described my invention as comprising a pair of contact carrying arms 11 and 12, and a single resistance unit 20, it should be understood that a plurality of such pairs of arms and resistance units can be employed as shown diagrammatically in Fig. 3 of the drawing where my invention is shown connected to a rotor winding 27 of a three phase induction motor of the wound rotor type in which a pair of contact carrying arms 11 and 12, and a resistance unit 20 are provided in each phase of the rotor of the motor.

When a plurality of arms 11 and 12 are used with a plurality of resistances 20 as when adapted to a multiphase induction motor, the outer arms 11 are adjusted to move outwardly simultaneously at a certain predetermined speed and the arms 12 are also adjusted to move outwardly simultaneously at a higher predetermined speed to thus insure a balanced electrical condition in the different phases of the rotor circuit.

What I claim as new and desire to secure by Letters Patent of the United States, is:

1. In a centrifugally operated contact making device, the combination of a plurality of independently movable contact carrying arms adapted to move outwardly in response to different speeds of rotation, pivots for said arms, said arms extending in the same direction from their pivots, a plurality of stationary contact members arranged adjacent one another, and a single resilient means for biasing said contact carrying arms against movement due to centrifugal force, said arms cooperating respectively with said contact members to successively make contact therewith as the speed of rotation of the device increases.

2. In a centrifugally operated contact making device, the combination of a plurality of independently movable contact carrying arms arranged in and adapted to move outwardly in the same plane in response to different speeds of rotation, and a single resilient means extending parallel with and between said contact carrying arms for biasing them against the movement due to centrifugal force.

3. In a centrifugally operated contact making device, the combination of a plurality of independently movable contact carrying arms adapted to move outwardly in response to different speeds of rotation, a projection on each of said contact carrying arms extending toward the other of said arms, and a single resilient means supported upon and between said projections for biasing said contact carrying arms against movement, said resilient means extending parallel with and between said contact carrying arms and exerting a different biasing effect upon each of said arms.

4. In a centrifugally operated contact making device, the combination of a plurality of independently movable contact carrying arms adapted to move outwardly in response to different speeds of rotation, a projection on each of said contact carrying arms extending toward the other of said arms, and a resilient means supported at one end to one of said projections and at its other end to the other of said projections, said resilient means extending parallel with and between said contact carrying arms and biasing said contact carrying arms against movements due to centrifugal force.

5. In a centrifugally operated contact making device, the combination of a plurality of independently pivoted contact carrying arms adapted to move outwardly in response to different speeds of rotation, pivots for supporting said arms, a projection on each of said contact carrying arms extending toward the other of said arms, and a resilient means supported at one end to one of said projections and at its other end to the other of said projections, said resilient means extending parallel with and between said contact carrying arms and biasing said contact carrying arms against movements due to centrifugal force, said projections and said resilient means being so located with respect to said pivots that the moment arm of resisting force exerted upon the contact carrying arms is reduced as the speed of the motor increases.

6. In a centrifugally operated contact making device, the combination of a plurality of independently movable contact carrying arms adapted to move outwardly in response to different speeds of rotation, a projection on each of said contact carrying arms extending toward the other said arms, the projection on the outer of said arms engaging the inner of said arms when said device is at rest whereby said inner arm acts as a stop for the outer arm, and a single resilient means supported upon and between said projections for biasing said contact carrying arms against movement, said resilient means extending parallel with and between said contact carrying arms and exerting a different biasing effect upon each of said arms.

7. In a centrifugally operated contact making device, the combination of a plurality of independently movable contact carrying arms adapted to move outwardly in response to different speeds of rotation, a projection on each of said contact carrying arms extending toward the other said arms, pivots for said arms, said arms extending in the same direction from their pivots, and a single resilient means supported upon and between said projections for biasing said contact carrying arms against said movement, said resilient means extending parallel with and between said contact carrying arms and exerting a different biasing effect upon each of said arms.

8. In a centrifugally operated contact making device, the combination of a plurality of independently movable contact carrying arms adapted to move outwardly in response to different speeds of rotation, a projection on each of said contact carrying arms extending toward the other of said arms, pivots for said arms, said arms extending in the same direction from their pivots, a plurality of stationary contact members arranged adjacent one another and a single resilient means supported upon and between said projections for biasing said contact carrying arms against said movement, said resilient means extending parallel with and between said contact carrying arms, said arms cooperating respectively with said contact members to successively make contact therewith as the speed of the rotation of the device increases.

9. In a centrifugally operated contact making device, the combination of a plurality of independently movable contact carrying arms adapted to move outwardly in response to different speeds of rotation, a projection on each of said contact carrying arms extending toward the other of said arms, the projection on the outer of said arms engaging the inner of said arms when said device is at rest whereby said inner arm acts as a stop for the outer arm, pivots for said arms, said arms extending in the same direction from their pivots, a plurality of stationary contact members arranged adjacent one another, and a single resilient means supported upon and between said projections for biasing said contact carrying arms against movement, said resilient means extending parallel with and between said contact carrying arms and exerting a different biasing effect upon each of said arms, said arms cooperating respectively with said contact members to successively make contact therewith as the speed of rotation of the device increases.

In witness whereof, I have hereunto set my hand this 16th day of May, 1924.

CAMPBELL MACMILLAN.